United States Patent
Konzorr

[11] 3,798,997
[45] Mar. 26, 1974

[54] PEDAL FOR BICYCLES AND THE LIKE
[75] Inventor: Hubert Konzorr, Unna, Germany
[73] Assignee: Union, Sils van de Loo & Co., Frondeberg/Ruhr, Germany
[22] Filed: May 23, 1973
[21] Appl. No.: 363,193

[30] Foreign Application Priority Data
Feb. 21, 1973  Germany......................2308461

[52] U.S. Cl. ............................................. 74/594.4
[51] Int. Cl............................................. B62m 3/08
[58] Field of Search................ 74/594.4, 594.1, 560; 85/46; 151/16

[56] References Cited
UNITED STATES PATENTS
643,615   2/1900   Nickerson............................ 151/16
3,304,829  2/1967  Raynovich, Jr........................ 85/46

Primary Examiner—Benjamin W. Wyche
Assistant Examiner—F. D. Shoemaker

[57] ABSTRACT

A pedal unit for bicycles and the like is constructed as a foot engaging part freely rotatably mounted on a shaft which extends beyond the foot engaging part and is threaded for engagement into a threaded bore in a crank arm. The threads on the pin run in both directions around the pin, so that the stem can be threaded into a right hand or a left hand threaded hole.

3 Claims, 4 Drawing Figures

PATENTED MAR 26 1974    3,798,997
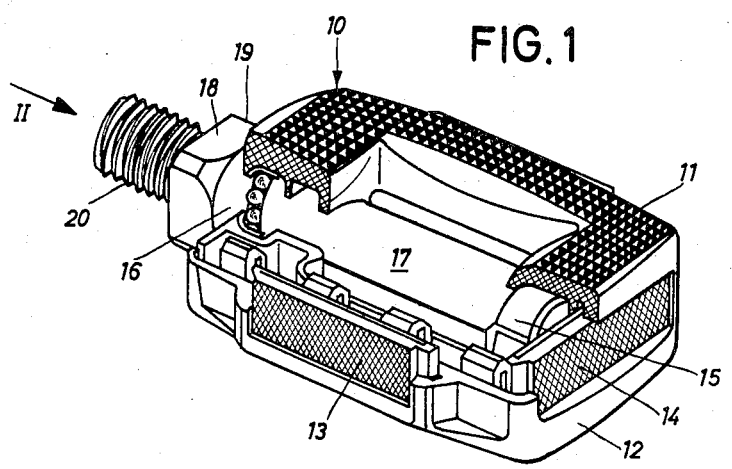
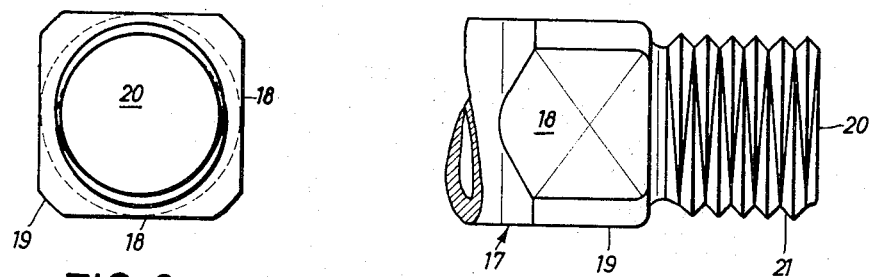
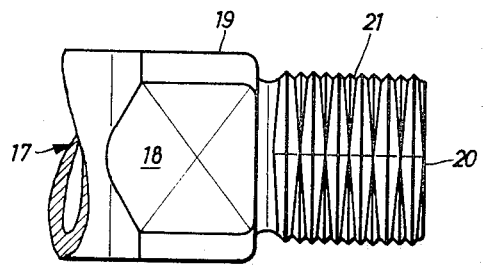

PEDAL FOR BICYCLES AND THE LIKE

BACKGROUND OF THE INVENTION

1. Field of the Invention

The invention relates to a pedal designed especially for bicycles or similar vehicles with a pedal axle on which a pedal body is turnably mounted but axially immovable, which axle extends outwardly at one side beyond the pedal body to permit screwing it into a threaded bore in a crank arm.

2. The Prior Art

In two wheel bicycles the pedals in all cases are threaded by means of threaded pins forming part of the pedal axle into corresponding bores at the ends of the crank arms. This threaded connection in order to assure against accidental release has right or left hand threads, depending on whether it is the right or left pedal.

In consequence of these different pin threads of counter-directed pitch on the right and left pedals, the production of pedal axles with two types of threads is necessary, which must be separately stocked and assembled. Finally the completely mounted pedals must be sorted into right and left hand types and packed in pairs. The manufacture of different pedal axles for right and left pedals, the separate stocking and assembling of such pedals and especially the packing for shipment cause considerable expense. Considering these inadequacies of the known type of pedals the invention provides an economically producable single pedal especially for two-wheel vehicles which however must be secured as in the existing art against accidental loosening.

SUMMARY OF THE INVENTION

This purpose is achieved in a pedal of the previously described type, in that the threaded pin is provided with two counter-running threads permitting the threading of this pin into right and left hand threaded bores, in which the crossing thread tracks are superimposed.

In an advantageous example of the invention the threads on the threaded pin of the pedal axle can have the same pitch, being however directed in opposite directions. A further characteristic of the invention can consist in the fact that the pin thread with counter-running crossing thread tracks is produced by forming, for example by rolling, pressing or the like.

The invention provides thus a single pedal whose pedal axle is provided with right and left hand threads, so that there is no difference between the right and left pedals. Pedals of the type according to the invention are, depending upon the design of the receiving threads in the crank arm, screwed in either to the right or to the left into threaded bores in the crank arm. According to the invention, there is in this way a great simplification in the manufacture of such pedals, especially with relation to the heretofore necessary separate storing and pair-wise packing, in which, as the foregoing explanation has shown, the occurrence of errors cannot be completely excluded.

BRIEF DESCRIPTION OF THE DRAWINGS

Further characteristics, advantages and improvements of the invention will be understood from the following drawings, in which:

FIG. 1 shows a pedal frame in perspective view partly in section;

FIG. 2 shows a side view of the threaded pin of the pedal axle in a direction of the arrow in FIG. 1;

FIG. 3 shows the threaded pin in side view in relation of FIG. 2, the pedal axle being broken away and;

FIG. 4 is a view of FIG. 3 in plan.

DESCRIPTION OF THE PREFERRED EMBODIMENTS

In the pedal shown in FIG. 1, the pedal body 10 is formed of two generally similar parts 11, 12 assembled and connected together in a way not here of further interest, such structures being well known. In the equally well known way reflectors 13 and 14 are set into the pedal body. The pedal body is mounted and turnably journalled by means of bearings indicated at 15, 16 on the pedal axle designated as a whole as 17. The pedal axle extends from the pedal body as is usual in such pedals, with a flange 19 with flats 18 and a pin 20 extending perpendicularly to the latter away from the pedal body 10.

In contrast to known pedal types, as is shown in FIGS. 2-4, the threaded pin 20 of the pedal axle 17 which is usually formed of a hollow body, is provided with both right and left hand threads, wherein the counter-running pitch of these threads is equal and the thread tracks cross each other. The result is that the two fastening threads arranged on the threaded pin overlie each other and thus allow the threading of the threaded pin into right or left hand female threads.

Naturally for the manufacture of the threaded pin in question other processes of thread forming can be used. In the case of the foregoing embodiment, however, a thread produced by forming, which has proven especially advantageous, as in the production of a finished thread by forming in comparison to cut threads, results in an especially high durability, which should be followed by a cold forming of the material.

I claim:

1. A pedal for bicycles and the like comprising an axle, a pedal body turnably mounted on the axle, the axle having a projection beyond one side of the body for threading into a female thread in a crank arm, said extension being substantially round in cross-section and being provided with two counter running left and right hand threads crossing each other and superimposed for threading into a right hand or left hand threaded bore.

2. Pedal as claimed in claim 1, in which the threads have the same pitch in opposite directions.

3. Pedal as claimed in claim 1, in which the threads are produced by forming.

* * * * *